United States Patent Office 2,904,581
Patented Sept. 15, 1959

2,904,581

PROCESS FOR THE ADDITION OF HCN ACROSS THE CARBON TO CARBON DOUBLE BOND OF AN ACTIVATED OLEFIN

George R. Coraor, Pitman, N.J., and Walter Z. Heldt, Wilmington, Del., assignors to E. I. du Pont de Nemours and Company, Wilmington, Del., a corporation of Delaware No Drawing. Application July 19, 1957
Serial No. 672,882

8 Claims. (Cl. 260—465.4)

The present invention relates to a process for the preparation of organic nitriles. More particularly, the present invention relates to a process for the catalytic addition of hydrogen cyanide to activated olefins.

It has been proposed to add hydrogen cyanide across the double bond of an activated olefin in the presence of an acid catalyst. See, for example, Kurtz, Ann. 572, 23 (1951), wherein is described the preparation of ethyl-β-cyanopropionate by the reaction of hydrogen cyanide and ethyl acrylate in the presence of sulfuric acid. The primary disadvantage of this technique is the excessive reaction times required to obtain sizeable yields.

It is an object of the present invention to provide a method for the catalytic addition of hydrogen cyanide to an activated olefin which accomplishes higher yields of the nitrile product in shorter reaction periods than has heretofore been possible. It is a further object of the present invention to provide such a process which is convenient and safe to perform. Other and additional objects will become apparent from a consideration of the ensuing specification and claims.

Broadly stated, our invention involves the addition of hydrogen cyanide to an activated olefin which is hydrocarbon except for the presence of an activating group adjacent to an olefinic carbon atom in the presence of a zero-valent metal cyanide complex having the empirical formula, $MNi(CN)_4$ wherein M has a valence of 4 and represents a group of from 2 to 4 atoms, each of which is selected from the class consisting of the alkali metals and the alkaline earth metals. We have found that the use of this catalyst greatly lessens the reaction period for the addition of HCN to activated olefins while at the same time accomplishing higher conversions than has heretofore been possible. The invention is illustrated by the following examples:

Example 1

0.83 mole of ethyl acrylate, 0.65 mole of hydrogen cyanide and 0.002 mole of $K_4Ni(CN)_4$ were heated for 3 hours at a temperature of 150° C. and under a pressure of 500 lbs. of nitrogen. 65.3 grams of ethyl-β-cyanopropionate was isolated as the only major product in 79% conversion based on the hydrogen cyanide, and in nearly quantitative yield.

Example 2

1.2 moles of acrylonitrile, 0.51 mole of hydrogen cyanide, and 0.003 mole of $K_4Ni(CN)_4$ were heated for three hours at 100° C. under a pressure of 500 lbs. of nitrogen. 38 grams of succinonitrile was isolated as the only major product in 93% conversion based on the hydrogen cyanide, and in essentially quantitative yield.

Example 3

A mixture of 1.0 mole of mesityl oxide, 1.0 mole of hydrogen cyanide, 0.01 mole of $K_4Ni(CN)_4$ and 250 ml. of benzene was heated at 60° C. for 1 hour under a pressure of 1450 lbs. of nitrogen. 16.5 grams of 4-cyano-4-methyl-2-pentanone was obtained, representing a conversion of 13%, based on the hydrogen cyanide.

Example 4

A mixture of 0.5 mole of β-nitrostyrene, 0.6 mole of hydrogen cyanide, 0.007 mole of $K_4Ni(CN)_4$ and 250 milliliters of benzene was heated at 100° C. for six hours under a pressure of 500 lbs. of nitrogen. 8.5 grams of 1-phenyl-2-nitropropionitrile was obtained, representing a conversion of 9.7% based on the β-nitrostyrene.

Example 5

A mixture of 1.63 moles of acrylonitrile, 0.78 mole of hydrogen cyanide, and 2 grams of $CaK_2Ni(CN)_4$ was heated for 3½ hours at a temperature of 150° C. under a pressure of 1000 lbs. of nitrogen. The reaction mass was then filtered and the products separated by distillation. 16.2 grams of succinonitrile was obtained, representing a conversion of 25%, based on the hydrogen cyanide.

Example 6

A mixture of 1 mole of methyl methacrylate, 1 mole of hydrogen cyanide and 2 grams of $CaK_2Ni(CN)_4$ was heated for 5 hours at a temperature of 150° C. and under a pressure of 500 lbs. of nitrogen. 18.3 grams of methyl-3-cyano-2-methylpropionate was obtained representing a conversion of 14% based on the hydrogen cyanide.

Example 7

A mixture of 1 mole of methyl methacrylate, 1 mole of hydrogen cyanide and 2 grams of $Na_4Ni(CN)_4$ was heated for five hours at a temperature of 150° C. and under a pressure of 500 lbs. of nitrogen. 28.8 grams of methyl-3-cyano-2-methylpropionate was obtained, representing a conversion of 22% based on the hydrogen cyanide.

Example 8

A mixture of 1.0 mole of ethyl acrylate, 0.7 mole of hydrogen cyanide and 2 grams of $Na_4Ni(CN)_4$ was heated for 4 hours at a temperature of 150° C. under a pressure of 500 lbs. of nitrogen. 79.2 grams of ethyl-β-cyanopropionate was obtained, representing a 90% conversion based on the hydrogen cyanide.

According to the present invention, hydrogen cyanide may be catalytically added across the carbon-to-carbon double bond of an activated olefin which is hydrocarbon except for the presence of an activating group adajcent to an olefinic carbon atom in the presence of a zero-valent metal cyanide complex, $MNi(CN)_4$ wherein M has a valence of 4 and represents a group of from 2 to 4 atoms, each of which is selected from the class consisting of the alkali metals and the alkaline earth metals. While the invention has been illustrated with nickel cyanide complexes of sodium, potassium, and calcium, complexes of the other alkali metals and alkaline earth metals are operable including, for example, lithium, rubidium, barium, and strontium, etc. The complex may be formed with four atoms of a single alkali metal or two atoms of a single alkaline earth metal, or it may include mixtures of two or more different atoms from these groups. Relatively speaking, the comlexes of sodium, potassium, and/ or calcium, either singly or mixed, are the easiest and most economical to prepare and for this reason represent the preferred forms of the catalyst.

By "activated olefin," we mean especially any compound of the general formula

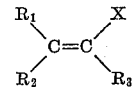

wherein each of $R_1$, $R_2$ and $R_3$ may be either a hydrogen atom, an aliphatic hydrocarbon radical, an aromatic hydrocarbon radical, an alicyclic hydrocarbon radical, an alkaryl hydrocarbon radical, or an aralkyl hydrocarbon radical, and wherein X is an activating group such as a cyano, keto, nitro, carbalkoxy or carboxyl group.

The zero-valent metal cyanide complex, $MNi(CN)_4$, may be prepared according to the procedure described by Eastes, J. W., and Burgess, W. M., "A Study of the Products Obtained by the Reducing Action of Metals Upon Salts in Liquid Ammonia Solutions," vol. 64, Journal of the American Chemical Society, page 1187 (January-June 1942). In the case of the calcium dipotassium derivative used as the catalyst in Examples 6 and 7, the procedure of Eastes and Burgess was modified slightly as indicated in the following example:

Example 9

Ten grams of calcium tetracyanonickelate, $CaNi(CN)_4$ was added in a closed system to liquid ammonia previously dried under metallic sodium. Potassium metal was added to this solution until the blue color barely persisted. The reaction temperature throughout the addition was −30° C. After addition was complete, the reaction mixture was stirred for two days with a magnetic stirrer, filtered, and the solid material washed three times with 200 ml. portions of fresh ammonia. The solid was separated by filtration.

The catalytic addition of hydrogen cyanide to activated olefins in accordance with the present invention may be performed at any temperature upwards of about 50° C. The only limitation on the use of elevated temperatures is that the temperatures employed be below the decomposition temperatures of the starting materials, catalysts, and/or the products. Temperatures in the range of about 60°–150° C. constitute the most convenient operating range, and thus represent the preferred operating temperatures.

Pressure is not generally critical to the process so long as sufficient pressure is employed to maintain the hydrogen cyanide in the liquid state. A pressure of 500–1000 lbs. of nitrogen has been found to be entirely adequate in all cases. Reaction periods should be long enough to carry the reaction to a reasonable conversion level. In most cases this is accomplished in a period of 6 hours or less.

We have described and illustrated our novel process in the foregoing specification. A great variety of starting materials may be used as well as a wide range of reaction conditions. We, therefore, intend to be limited only by the following claims.

We claim:

1. A process for the addition of hydrogen cyanide across the carbon-to-carbon double bond of an activated olefin which is hydrocarbon except for the presence of an activating group adjacent to an olefinic carbon atom which comprises mixing the olefin and liquid hydrogen cyanide in the presence of a zero-valent metal cyanide complex having the formula $MNi(CN)_4$ wherein M has a valence of 4 and represents a group of from 2 to 4 atoms each of which is selected from the class consisting of the alkali metals and the alkaline earth metals, at a temperature in excess of about 50° C. and under a pressure sufficient to maintain the hydrogen cyanide in the liquid state throughout the reaction.

2. A process according to claim 1 in which the activated olefin is represented by the following formula:

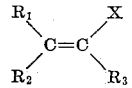

wherein each of $R_1$, $R_2$, and $R_3$ is selected from the group consisting of a hydrogen atom, an aliphatic hydrocarbon radical, an alicyclic hydrocarbon radical, an aromatic hydrocarbon radical, an alkaryl hydrocarbon radical and an aralkyl hydrocarbon radical, and wherein X is selected from the class consisting of cyano, keto, nitro, carbalkoxy and carboxyl groups.

3. A process for the preparation of ethyl β-cyanopropionate which comprises mixing ethyl acrylate and liquid hydrogen cyanide in the presence of a zero-valent metal cyanide complex having the formula $MNi(CN)_4$ wherein M has a valence of 4 and represents a group of from 2 to 4 atoms each of which is selected from the class consisting of the alkali metals and the alkaline earth metals, at a temperature in excess of about 50° C. and under sufficient pressure to maintain the hydrogen cyanide in the liquid state throughout the reaction.

4. A process for the preparation of succinonitrile which comprises mixing acrylonitrile and liquid hydrogen cyanide in the presence of a zero-valent metal cyanide complex having the formula $MNi(CN)_4$ wherein M has a valence of 4 and represents a group of from 2 to 4 atoms each of which is selected from the class consisting of the alkali metals and the alkaline earth metals, at a temperature in excess of about 50° C. and under sufficient pressure to maintain the hydrogen cyanide in the liquid state throughout the reaction.

5. A process for the preparation of organic nitriles by the addition of hydrogen cyanide across the carbon-to-carbon double bond of an activated olefin which is hydrocarbon except for the presence of an activating group adjacent to an olefinic carbon atom which comprises mixing the olefin with liquid hydrogen cyanide in the presence of a zero-valent metal cyanide complex having the formula $MNi(CN)_4$ wherein M has a valence of 4 and represents a group of from 2 to 4 atoms each of which is selected from the class consisting of the alkali metals and the alkaline earth metals, at a temperature in the range of about 60–150° C. and under a pressure sufficient to maintain the hydrogen cyanide in the liquid state throughout the reaction.

6. A process as in claim 5 wherein the zero-valent metal cyanide complex is $K_4Ni(CN)_4$.

7. A process as in claim 5 wherein the zero-valent metal cyanide complex is $Na_4Ni(CN)_4$.

8. A process as in claim 5 wherein the zero-valent metal cyanide complex is $CaK_2Ni(CN)_4$.

References Cited in the file of this patent

UNITED STATES PATENTS

| | | |
|---|---|---|
| 2,571,099 | Arthur et al. | Oct. 16, 1951 |
| 2,596,826 | Stewart | May 13, 1952 |